(12) United States Patent
Karafillis et al.

(10) Patent No.: US 10,563,868 B2
(45) Date of Patent: Feb. 18, 2020

(54) COUPLING METHOD AND STRUCTURE FOR A PROPULSION SYSTEM HOT SECTION

(71) Applicant: General Electric Company, Schenectady, NY (US)

(72) Inventors: Apostolos Pavlos Karafillis, Winchester, MA (US); Kevin Kenneth Pruzinsky, Lynn, MA (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 15/589,117

(22) Filed: May 8, 2017

(65) Prior Publication Data

US 2018/0320899 A1 Nov. 8, 2018

(51) Int. Cl.
*F23R 3/18* (2006.01)
*F02K 3/10* (2006.01)
*F02C 7/20* (2006.01)

(52) U.S. Cl.
CPC .................. *F23R 3/18* (2013.01); *F02C 7/20* (2013.01); *F02K 3/10* (2013.01); *F05D 2260/30* (2013.01)

(58) Field of Classification Search
CPC ...... F23R 3/18; F23R 3/20; F23R 3/22; F02K 3/10; F02K 3/08; F23D 11/406
USPC .......................................... 60/765, 763, 749
See application file for complete search history.

(56) References Cited

U.S. PATENT DOCUMENTS

| 3,269,115 | A | * | 8/1966 | Nelson, Jr. ................. F23R 3/20 60/739 |
| 3,765,178 | A | * | 10/1973 | Hufnagel ................... F23R 3/20 60/765 |
| 4,064,691 | A | * | 12/1977 | Nash ......................... F23R 3/18 60/266 |
| 5,103,638 | A | * | 4/1992 | Roberts ..................... F23R 3/18 267/229 |
| 5,491,974 | A | * | 2/1996 | Shimmel .................... F23R 3/20 60/749 |
| 7,493,771 | B2 | | 2/2009 | Lohmueller et al. |
| 7,946,119 | B2 | | 5/2011 | Geary |
| 9,310,083 | B2 | | 4/2016 | Bunel et al. |
| 2005/0016182 | A1 | | 1/2005 | Morenko |
| 2014/0174088 | A1 | | 6/2014 | Ruberte Sanchez et al. |
| 2015/0044043 | A1 | | 2/2015 | Swan et al. |
| 2016/0245517 | A1 | | 8/2016 | Sonntag et al. |

\* cited by examiner

*Primary Examiner* — Todd E Manahan
*Assistant Examiner* — Todd N Jordan
(74) *Attorney, Agent, or Firm* — Dority & Manning, P.A.

(57) ABSTRACT

The present disclosure is directed to a method and structure of coupling a flameholder assembly to a hot section of a propulsion system, such as an afterburning exhaust section. The propulsion system includes an outer casing and an inner casing defining a flameholder assembly disposed radially within the outer casing. The method includes providing a housing defining a retaining rod and groove into which a structural member attaches; providing a retaining plate defining an opening through which the structural member is extended; coupling the structural member to the retaining rod of the housing and the outer casing of the propulsion system; and coupling the retaining plate to the housing and the inner casing of the propulsion system such that the structural member is retained between the housing and the retaining plate.

20 Claims, 4 Drawing Sheets

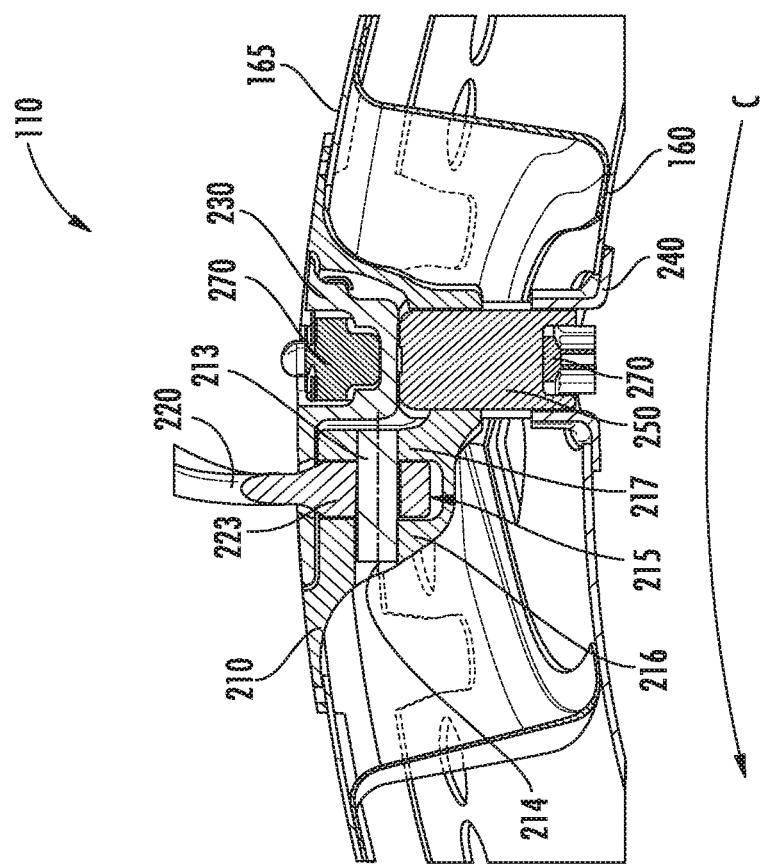
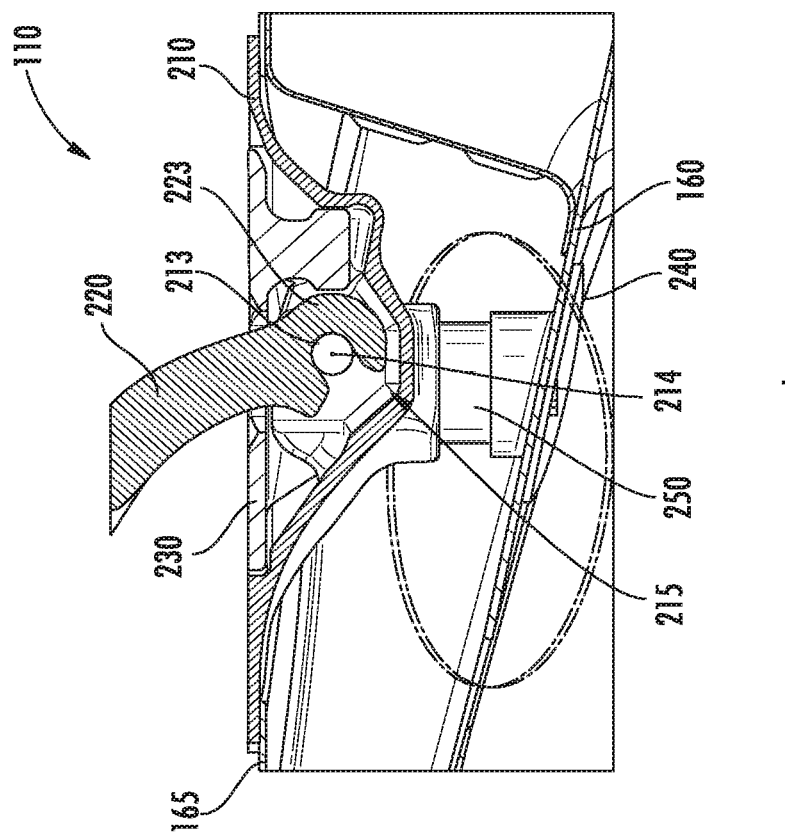
FIG. 5
FIG. 4

COUPLING METHOD AND STRUCTURE FOR A PROPULSION SYSTEM HOT SECTION

FEDERALLY SPONSORED RESEARCH

This invention was made with government support under contract number N00019-09-G-0009 of the U.S. Government. The government may have certain rights in the invention.

FIELD

The present subject matter relates generally to propulsion system hot section assemblies. More particularly, the present subject matter relates to coupling methods and structures for propulsion system hot sections.

BACKGROUND

Propulsion systems, such as afterburning gas turbine engines, generally include coupling structures with structural cases, such as flameholder assemblies or combustion sections. Such structures, such as afterburner flameholder assemblies, generally include a mechanical fastener that may generally loosen, deteriorate, or otherwise liberate or fail due to thermal relaxation and exposure to combustion gases within a hot section of a propulsion system (e.g., a combustion section, a turbine section, or an exhaust section). Loss of mechanical fasteners within such structures may enable the structure to displace and undesirably contact other structures, thereby leading to structural deterioration, wear, abrasion, and ultimately structural failure.

Therefore, there is a need for a coupling structure that may enable a separable coupling in a hot section flowpath exposed to an axial load, a torsional load, or both while mitigating a loss of clamping force and undesired displacement of the coupling structure.

BRIEF DESCRIPTION

Aspects and advantages of the invention will be set forth in part in the following description, or may be obvious from the description, or may be learned through practice of the invention.

The present disclosure is directed to a method of coupling a flameholder assembly to an afterburning exhaust section of a propulsion system. The propulsion system includes an outer casing and an inner casing defining a flameholder assembly disposed radially within the outer casing. The method includes providing a housing defining a retaining rod and groove into which a structural member attaches; providing a retaining plate defining an opening through which the structural member is extended; coupling the structural member to the retaining rod of the housing and the outer casing of the propulsion system; and coupling the retaining plate to the housing and the inner casing of the propulsion system such that the structural member is retained between the housing and the retaining plate.

In one embodiment, coupling the retaining plate to the housing includes fastening the retaining plate to the housing via a mechanical fastener through a coupling member attached to the inner casing of the propulsion system.

In another embodiment, coupling the structural member to the retaining rod of the housing couples the flameholder assembly to an outer casing of the propulsion system.

In still another embodiment, coupling the retaining plate to the housing and the inner casing includes providing a second inner casing radially outward of the inner casing; providing a spacer between the retaining plate and the inner casing, in which the retaining plate is coupled to the housing; and coupling the housing to the second inner casing, in which coupling the housing to the second inner casing couples the flameholder assembly to the outer casing.

In yet another embodiment, coupling the retaining plate to the housing defines a load path through the inner casing, the spacer, and the retaining plate via the mechanical fastener.

In still yet another embodiment, coupling the structural member to the retaining rod of the housing and the outer casing of the propulsion system defines a load path through the retaining rod of the housing, the structural member at the first end coupled to the retaining rod, and the structural member at the second end coupled to the outer casing of the propulsion system.

In various embodiments, coupling the structural member to the retaining rod provides an axis of rotation generally tangent to a circumferential direction around an axial centerline of the propulsion system, and wherein the structural member is restricted from displacement along the axis of rotation. In one embodiment, coupling the structural member to the retaining rod restricts displacement of the coupling assembly along the longitudinal direction of the propulsion system.

The present disclosure is further directed to a propulsion system including a compressor section, a combustion section, a turbine section, and an afterburning exhaust section in serial arrangement and generally surrounded by an outer casing extended along a longitudinal distance of the propulsion system. The propulsion system further includes a flameholder assembly disposed in the afterburning exhaust section. The flameholder assembly includes a housing defining a groove including a retaining rod; a structural member defining a first end and a second end, in which the first end defines a first coupling member coupled to the retaining rod of the housing, and wherein the second end defines a second coupling member coupled to the outer casing; and a retaining plate coupled to the housing, in which the structural member is retained within the groove of the housing by the retaining rod of the housing and the retaining plate.

In various embodiments of the propulsion system, the first end of the structural member is retained within the retaining rod and the retaining plate. In one embodiment, the flameholder assembly further includes a coupling member attached to an annular flameholder casing. The flameholder assembly further includes a spacer disposed between the coupling member and the retaining plate, in which a mechanical fastener couples together the coupling member, the spacer, and the retaining plate. In another embodiment, the flameholder assembly defines a load path through an annular flameholder casing, the coupling member, the spacer, and the retaining plate via the mechanical fastener. In still another embodiment, the propulsion system defines a load path through the flameholder assembly. The flameholder assembly defines a load path through the retaining rod of the housing, the structural member at the first end coupled to the retaining rod, and the structural member at the second end coupled to the outer casing of the propulsion system.

In one embodiment of the propulsion system, the retaining rod defines an axis of rotation generally tangent to a circumferential direction around an axial centerline of the propulsion system, and the structural member is restricted from displacement along the axis of rotation.

In another embodiment of the propulsion system, the retaining rod restricts displacement of the coupling assembly along the longitudinal direction of the propulsion system.

The present disclosure is yet further directed to a gas turbine engine including a hot section defining a combustion section, a turbine section, and an afterburning exhaust section. The gas turbine engine includes an outer casing extended generally along a longitudinal direction surrounding the hot section; an inner casing extended generally along the longitudinal direction and radially within the outer casing; and a coupling assembly. The coupling assembly includes a housing defining a groove and a retaining rod; a structural member defining a first end and a second end, in which the first end is coupled to the retaining rod, and wherein the second end is coupled to the outer casing; a retaining plate coupled to the housing and retaining the structural member to the retaining rod within the groove of the housing; a coupling member attached to an annular flameholder casing; and a spacer disposed between the coupling member and the housing, in which a mechanical fastener couples together the coupling member, the spacer, the housing, and the retaining plate.

In various embodiments, a mechanical fastener couples the coupling member, the spacer, and retaining plate. In one embodiment, the gas turbine engine defines a load path through the inner casing, the coupling member, the spacer, and the retaining plate.

In another embodiment, the inner casing and the outer casing are each disposed in the combustion section of the engine.

In yet another embodiment, the inner casing and the outer casing are each disposed in the afterburning exhaust section of the engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 is a cross sectional side view of the exemplary embodiment of the coupling assembly generally provided in FIGS. 2-3;

FIG. 5 is another cross sectional side view of the exemplary embodiment of the coupling assembly generally provided in FIGS. 2-3.

Figure 1:
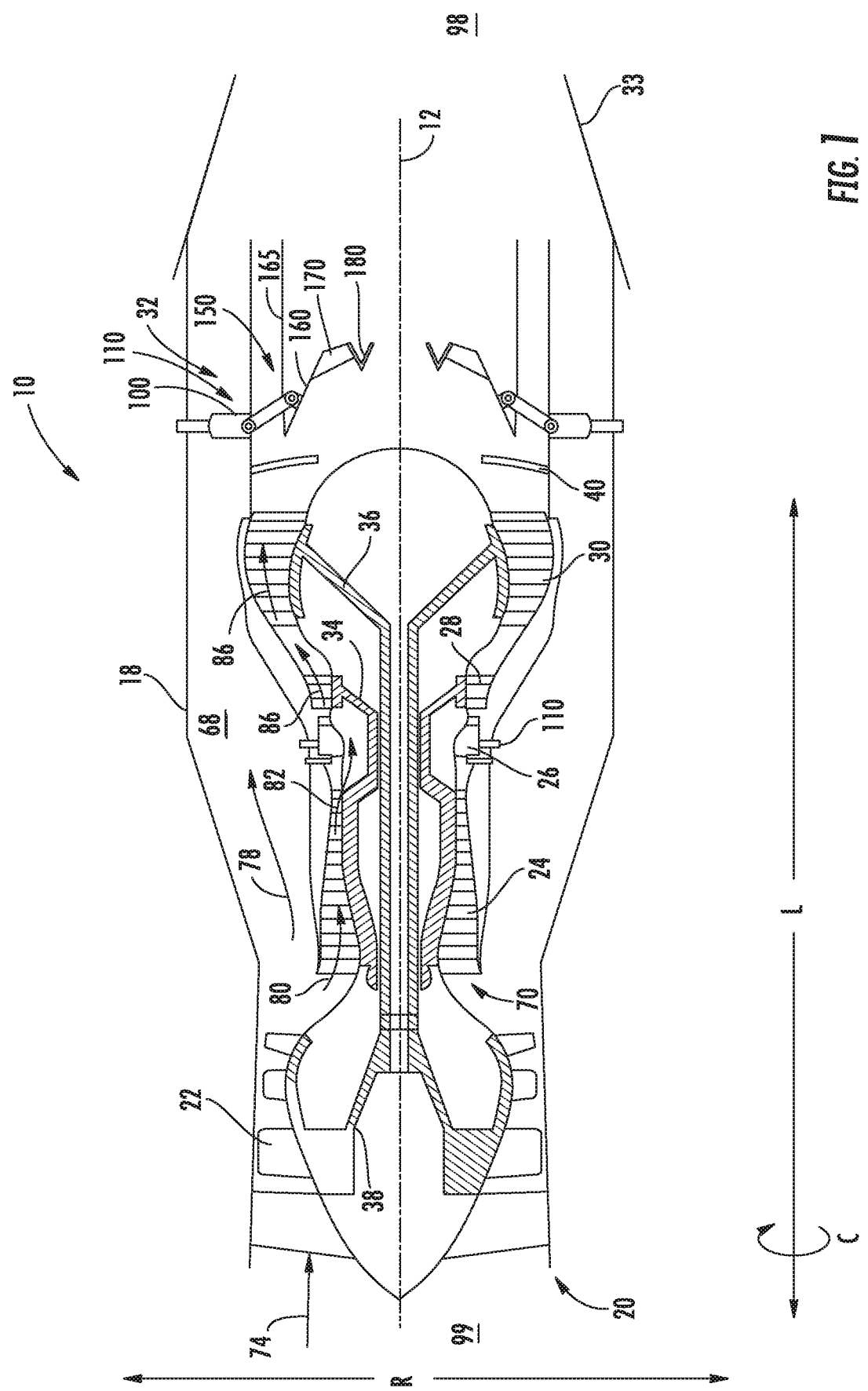
FIG. 1 is a schematic cross sectional view of an exemplary propulsion system incorporating an exemplary embodiment of a coupling assembly for a hot section.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" or an upstream end 99 refers to the direction from which the fluid flows, and "downstream" or a downstream end 98 refers to the direction to which the fluid flows.

Methods and structures for coupling a hot section to a propulsion system are generally provided that may enable a separable coupling in a hot section flowpath exposed to an axial load, a torsional load, or both while mitigating a loss of clamping force and undesired displacement of the coupling structure. Mitigating the loss of clamping force may prevent movement, rotation, bending, or breakage of the coupling structure, such as a flameholder assembly within an afterburning exhaust section or a combustor hanger of a combustion section, and thereby prevent wear and failure of the coupling structure.

Referring now to the drawings, FIG. 1 is a schematic partially cross-sectioned side view of an exemplary propulsion system defining a high by-pass turbofan engine 10 herein referred to as "engine 10" as may incorporate various embodiments of the present disclosure. Although further described below with reference to a turbofan engine, the present disclosure is also applicable to propulsion systems in general, including turbomachinery in general such as turbojet, turboprop, and turboshaft gas turbine engines, including marine and industrial turbine engines and auxiliary power units. The present disclosure is further applicable to propulsion systems including rockets, missiles, ramjet, scramjet, etc. The engine 10 generally defines a longitudinal direction L, a radial direction R, and a circumferential direction C. As shown in FIG. 1, the engine 10 has a longitudinal or axial centerline axis 12 that extends there through for reference purposes. The engine 10 also has an upstream end 99 and a downstream end 98 denoted for reference purposes The engine 10 generally includes, in serial flow arrangement, a fan or low pressure (LP) compressor 22, a high pressure (HP) compressor 24, a combustion section 26, a turbine section including a high pressure (HP) turbine 28 coupled to the HP compressor 24 via an HP shaft 36, a low pressure (LP) turbine 30 coupled to the fan or LP compressor 22 via an LP shaft 34, and an afterburning exhaust section 32.

The afterburning exhaust section 32 includes a flameholder assembly 100 extended from an outer casing 18 of the engine 10. The flameholder assembly 100 includes a coupling assembly 110 coupling the outer casing 18 to an annular flameholder casing 150. The flameholder casing 150 generally includes a generally inner casing 160 coupled to one or more struts 170 disposed in circumferential arrangement around the axial centerline 12. The struts 170 couple a flameholder 180 generally defining an annular inner casing designed to prevent a flame from extinguishing or blowing out by inducing a relatively low speed current of fluid to aide flame propagation. In the embodiment of the engine 10 generally provided in FIG. 1, the flameholder 180 defines a generally V-shaped structure. In various embodiments, the flameholder 180 may define an H-shaped structure or a blunt- or bluff-body.

In various embodiments of the engine 10, the coupling assembly 110 may be disposed in the combustion section 26 to mount a combustor or a diffuser case, or portions thereof, within the combustion section 26.

During an operation of the engine 10, a quantity of air, shown schematically as arrows 74, enters the engine 10 through an inlet 20 upstream of the fan or LP compressor 22. The air 74 passes across the fan or LP compressor 22, downstream of which a portion of air, shown schematically by arrows 78, passes through a bypass flowpath 68 defined generally around the engine core that generally includes the HP compressor 24, the combustion section 26, and the HP turbine 28. Another portion of the air 74, shown schematically by arrows 80, enters into a core flowpath 70 defined through the HP compressor 24, the combustion section 26, the HP turbine 28, the LP turbine 30, and the afterburning exhaust section 32.

The air 80 is progressively compressed through the HP compressor 24 and enters the combustion section 26, as shown schematically by arrows 82. The air 82 is mixed with a fuel in the combustion section 26 and ignited to generate combustion gases, shown schematically by arrows 86. The combustion gases 86 flow through the turbine section and induce rotation of the HP turbine 28, thereby driving the HP compressor 24 to which it is attached via the HP shaft 34 extended along the longitudinal direction L. The combustion gases 86 further flow across the LP turbine 30, thereby driving the fan or LP compressor 22 attached via the LP shaft 36 extended generally along the longitudinal direction L, coaxially within the HP shaft 34.

The afterburning exhaust section 32 may introduce a fuel through a spraybar 40 extended generally along the radial direction R into the core flowpath 70 aft or downstream of the LP turbine 30. The fuel mixes with the combustion gases 86 and ignites to further generate thrust. The flameholder assembly 100 is disposed generally aft or downstream of the spraybars 40 to aide in flame retention or propagation, or otherwise mitigate blow out of the afterburning flame generated by introducing fuel through the spraybars 40.

Figure 3:
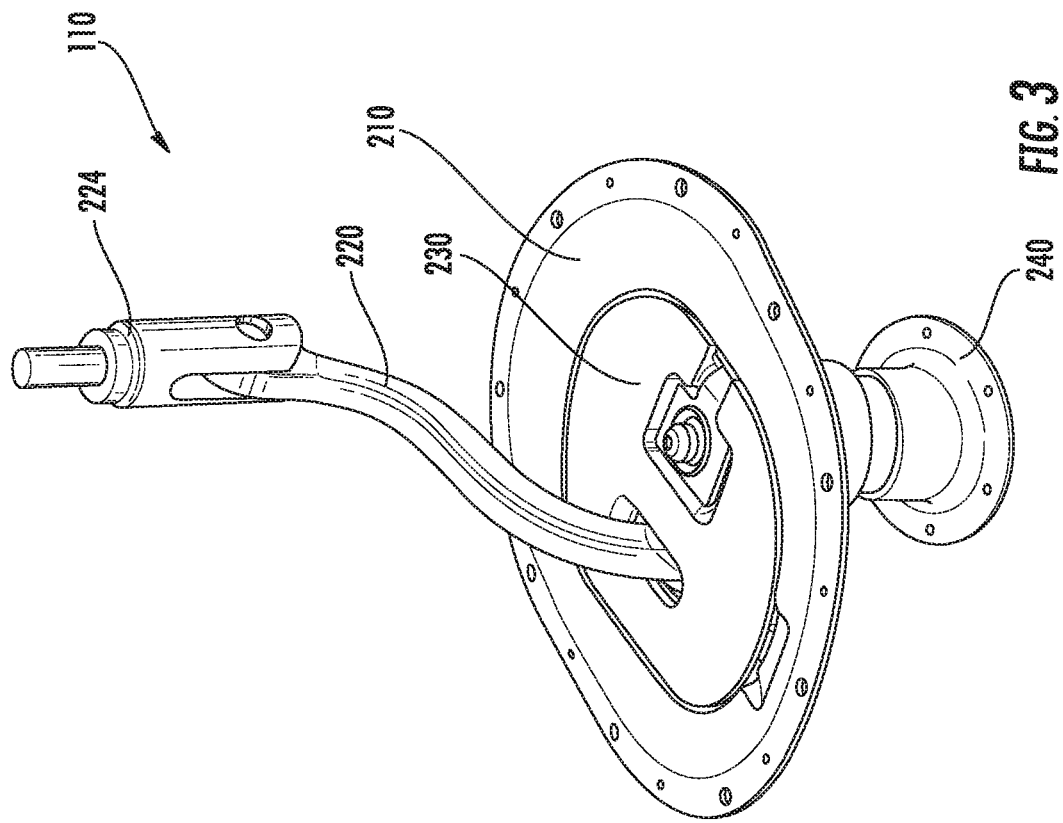
FIG. 3 is another perspective view of an exemplary embodiment of a portion of the coupling assembly generally provided in the propulsion system of FIG. 1.
Figure 2:
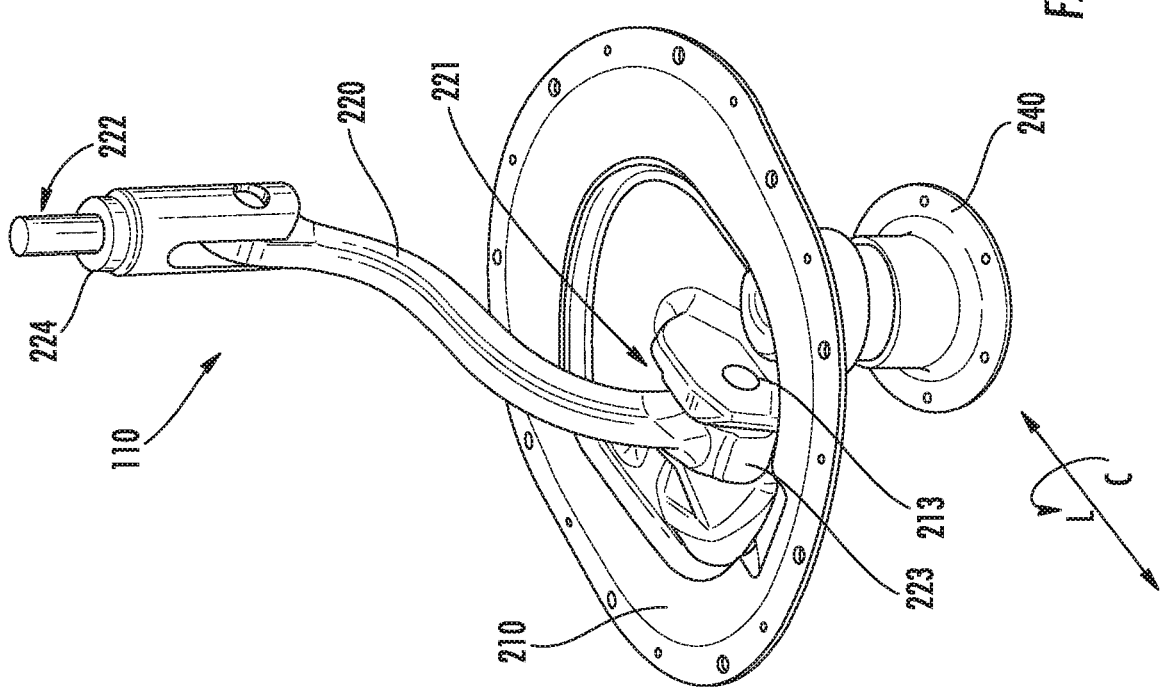
FIG. 2 is a perspective view of an exemplary embodiment of a portion of the coupling assembly generally provided in the propulsion system of FIG. 1.

Referring now to FIGS. 2-5, perspective views of a portion of exemplary embodiments of the coupling assembly 110 are generally provided in FIGS. 2-3 and cross sectional views of a portion of exemplary embodiments of the coupling assembly 110 are generally provided in FIGS. 4-5. The coupling assembly 110 a housing 210 defining a groove 215 including a retaining rod 213. The coupling assembly 110 further includes a structural member 220 defining a first end 221 and a second end 222. The first end 221 defines a first coupling member 223 coupled to the retaining rod 213 of the housing 210. The second end 222 defines a second coupling member 224 coupled to the outer casing 18 (shown in FIG. 1) of the engine 10. The coupling assembly 110 further includes a retaining plate 230 coupled to the housing 210. The structural member 220 is retained within the groove 215 of the housing 210 by the retaining rod 213 and the retaining plate 230. The first end 221 of the structural member 220 is generally retained within the retaining rod 220 and the retaining plate 230. In various embodiments, a plurality of the coupling assembly 110 is coupled to the outer casing 18 of the engine 10 and the inner casing 160 in adjacent arrangement along the circumferential direction C.

Referring still to FIGS. 2-5, the groove 215 into which the first end 221 of the structural member 220 is disposed, and through which the retaining rod 213 extends, is defined by a first wall 216 and a second wall 217 (shown in FIG. 5) each extended at least partially along the longitudinal direction L. The retaining rod 213 extends through the first wall 216 and the second wall 217 and through the groove 215. The first coupling member 223 of the structural member 220 may define a hook, orifice, or slotted orifice such as generally provided in FIG. 4, through which the retaining rod 213 is extended. The first coupling member 223 of the structural member 220 is disposed at least partially within the groove 215 and between the retaining rod 213 and the retaining plate 230. The structural member 220, and the coupling assembly 110 generally, is generally restricted or limited from rotation along an axis of rotation 214 defined by the retaining rod 213. For example, the axis of rotation 214 of the retaining rod 213 is defined generally tangent to the circumferential direction C such as generally provided in FIG. 5. The coupling assembly 110 may therefore restrict movement of the inner casing 160, such as the flameholder assembly 100 generally, at least partially along the longitudinal direction L such as generally provided in FIG. 4.

Referring still to FIGS. 2-5, the coupling assembly 110 may further include a coupling member 240 coupled to the inner casing 160. In various embodiments, the inner casing 160 is a member of the annular flameholder casing 150 such as generally provided in FIG. 1. The coupling assembly 110 may further include a spacer 250 disposed through the housing 210 and between the coupling member 240 and the retaining plate 230. In various embodiments, the spacer 250 may define a washer, grommet, or generally structure providing support to a mechanical fastener 270 to clamp or couple together the coupling member 240, the spacer 250, the housing 210, and the retaining plate 230. In still various embodiments, the mechanical fastener 270 includes a bolt, screw, nut, washer, tie rod, etc., or combinations thereof.

The coupling assembly 110 attached to the outer casing 18 of the engine and the inner casing 160, such as of the flameholder assembly 150 of the afterburning exhaust section 32, may define a load path through the retaining rod 213 of the housing 210, the first coupling member 223 of the structural member 220 attached thereto, and the second coupling member 224 of the structural member 220 attached to the outer casing 18. The coupling assembly 110 may further define a load path through the inner casing 160, the coupling member 240, the spacer 250, and the retaining plate 210 via the mechanical fastener 270. In various embodiments, the housing 210 is coupled to the inner casing 160, to a second inner casing 165 (e.g., outward along the radial direction R of the inner casing 160), or both. The housing 210 may be coupled via a mechanical fastener (e.g., bolt, rivet, screw, tie rod, pin, nut, etc.), a mechanical joining process (e.g., welding, soldering, brazing, etc.), or combinations thereof.

The coupling assembly 110 and flameholder assembly 100 provided herein may generally improve upon existing assemblies within propulsion system hot sections, or more specifically, afterburning exhaust sections 32, by defining a clamping force or load path from the inner casing 160 to the second inner casing 165 via the coupling member 240 attached to the inner casing 160 (e.g., via a joining method, mechanical fastener, or combinations thereof), the spacer 250, retaining plate 230, and the mechanical fastener 270 extended therethrough providing a clamping force. The mechanical fastener 270 generally joins the retaining plate 230 to the housing 210 and restricts or limits displacement of the structural member 220. The housing 210 is further coupled to the second inner casing 165. The structural member 220 is hooked, wrapped, attached, or otherwise disposed around the retaining rod 213 of the housing 210 within the groove 215 which, with the retaining plate 230, retains the structural member 220 within the groove 215 and provides structural support from the inner casing 160 and the second inner casing 165 to the outer casing 18 via the second coupling member 224 of the structural member 220 attached to the outer casing 18. As such, hooking or wrapping the structural member 220 to the retaining rod 213 may generally limit a load transferred through the housing 210 to the mechanical fastener 270, thereby mitigating a loss of clamping force and undesired displacement of the coupling assembly 110, the inner casing 160, or the flameholder assembly 100 generally.

Figure 6:
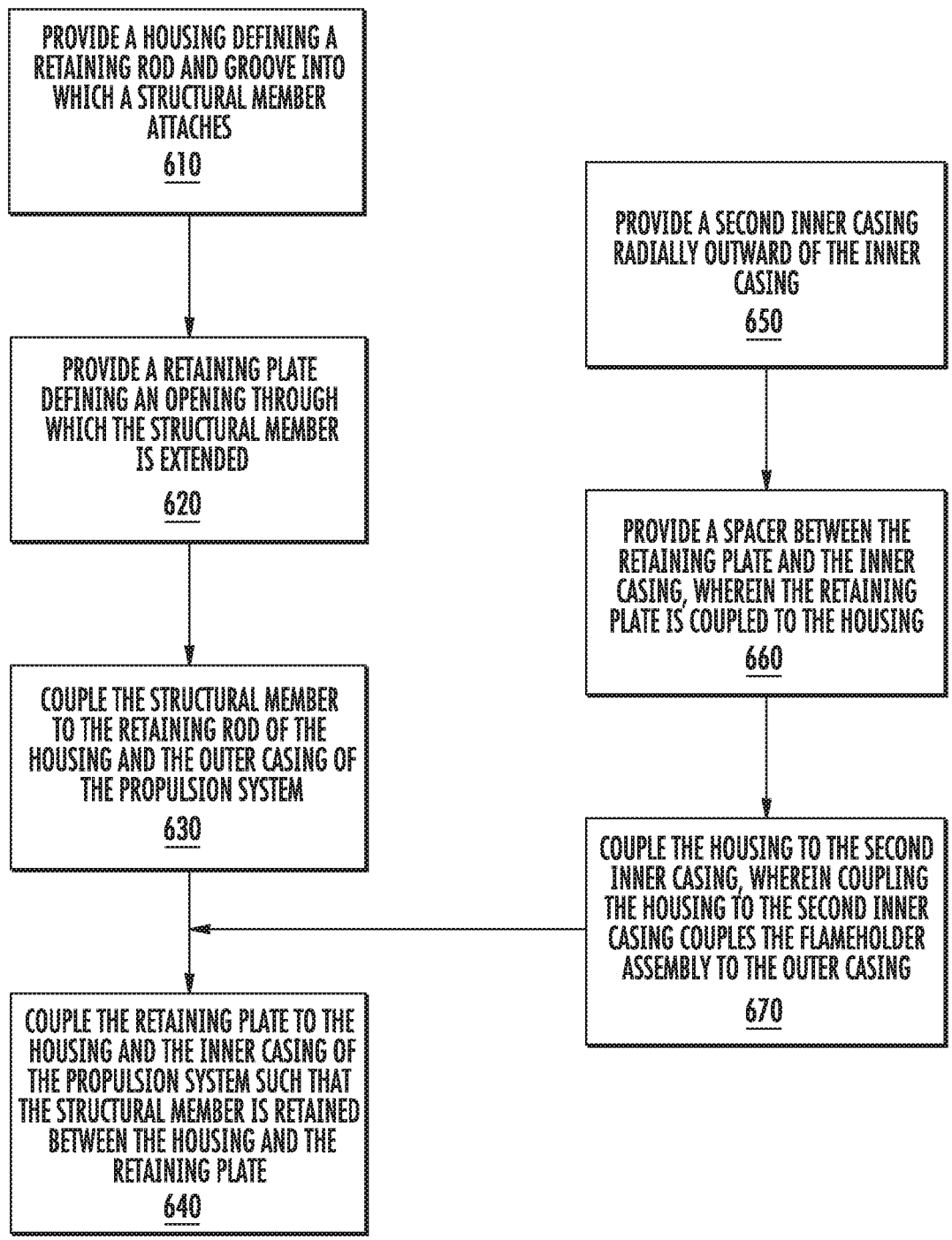
FIG. 6 is a flowchart outlining steps of an exemplary embodiment of a method of coupling a hot section to a propulsion system.

Referring now to FIG. 6, a flowchart outlining steps of an exemplary embodiment of a method of coupling a flameholder assembly, hot section, or coupling assembly to a propulsion system (hereinafter referred to as "method 600") is generally provided. The method 600 may be implemented with propulsion systems such as the engine 10 shown and described in regard to FIGS. 1-5.

The method 600 includes at 610 providing a housing defining a retaining rod and groove into which a structural member attaches; at 620 providing a retaining plate defining an opening through which the structural member is extended; at 630 coupling the structural member to the retaining rod of the housing and the outer casing of the propulsion system; and at 640 coupling the retaining plate to the housing and the inner casing of the propulsion system such that the structural member is retained between the housing and the retaining plate.

In various embodiments, at 640 coupling the retaining plate to the housing includes fastening the retaining plate to the housing via a mechanical fastener through a coupling member attached to the inner casing of the propulsion system. In one embodiment at 640, coupling the retaining plate to the housing defines a clamping force on the structural member. In another embodiment at 640, coupling the retaining plate to the housing defines a load path through the inner casing, the spacer, and the retaining plate via the mechanical fastener.

In still various embodiments, at 630 coupling the structural member to the retaining rod of the housing couples the flameholder assembly to an outer casing of the propulsion system. In one embodiment at 630, coupling the structural member to the retaining rod provides an axis of rotation generally tangent to a circumferential direction around an axial centerline of the propulsion system, and wherein the structural member is restricted from displacement along the axis of rotation. In another embodiment at 630, coupling the structural member to the retaining rod restricts displacement of the coupling assembly along the longitudinal direction of the propulsion system.

The method 600 may further include at 650 providing a second inner casing radially outward of the inner casing; at 660 providing a spacer between the retaining plate and the inner casing, wherein the retaining plate is coupled to the housing; and at 670 coupling the housing to the second inner casing, wherein coupling the housing to the second inner casing couples the flameholder assembly to the outer casing.

Each of the aforementioned steps of various embodiments of method 600 may include various embodiments of the engine 10, flameholder assembly 100, coupling assembly 110, outer casing 18, inner casing 160, second inner casing 165, structural arm 220, housing 230, coupling member 240 (in various embodiments, integral to the inner casing 160), spacer 250, and mechanical fastener 270, including features, variations, operations, etc. as shown and described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of coupling a flameholder assembly to an afterburning exhaust section of a propulsion system, wherein the propulsion system includes an outer casing and an inner casing defining a flameholder assembly disposed radially within the outer casing, the method comprising:
   providing a housing defining a groove, and a retaining rod within the groove to which a structural member attaches;
   providing a retaining plate defining an opening through which the structural member is extended;
   coupling the structural member to the retaining rod of the housing and the outer casing of the propulsion system; and
   coupling the retaining plate to the housing and the inner casing of the propulsion system such that the structural member is retained by the retaining rod of the housing and the retaining plate, the retaining plate at least partially surrounding the structural member within the groove.

2. The method of claim 1, wherein coupling the retaining plate to the housing includes fastening the retaining plate to the housing via a mechanical fastener through a coupling member attached to the inner casing of the propulsion system.

3. The method of claim 1, wherein coupling the structural member to the retaining rod of the housing couples the flameholder assembly to an outer casing of the propulsion system.

4. The method of claim 1, wherein coupling the retaining plate to the housing and the inner casing comprises:
   wherein the inner casing is a first inner casing;
   providing a second inner casing radially outward of the first inner casing;
   providing a spacer between the retaining plate and the first inner casing, wherein the retaining plate is coupled to the housing; and
   coupling the housing to the second inner casing, wherein coupling the housing to the second inner casing couples the flameholder assembly to the outer casing.

5. The method of claim 1, wherein coupling the retaining plate to the housing defines a load path through the inner casing, a spacer, and the retaining plate via a mechanical fastener.

6. The method of claim 1, wherein coupling the structural member to the retaining rod of the housing and the outer casing of the propulsion system defines a load path through the retaining rod of the housing, the structural member at a first end coupled to the retaining rod, and the structural member at a second end coupled to the outer casing of the propulsion system.

7. The method of claim 1, wherein coupling the structural member to the retaining rod provides an axis of rotation generally tangent to a circumferential direction around an axial centerline of the propulsion system, and wherein the structural member is restricted from displacement along the axis of rotation.

8. The method of claim 7, wherein coupling the structural member to the retaining rod restricts displacement of the flameholder assembly along the longitudinal direction of the propulsion system.

9. A propulsion system comprising a compressor section, a combustion section, a turbine section, and an afterburning exhaust section in serial arrangement and generally surrounded by an outer casing extended along a longitudinal distance of the propulsion system, wherein the propulsion system further comprises:
  a flameholder assembly disposed in the afterburning exhaust section, the flameholder assembly comprising:
    a housing defining a groove, and a retaining rod within the groove;
    a structural member defining a first end and a second end, wherein the first end defines a first coupling member coupled to the retaining rod of the housing, and wherein the second end defines a second coupling member coupled to the outer casing;
    a retaining plate coupled to the housing, wherein the retaining plated defines an opening through which the structural member is extended; and
    wherein the first end of the structural member is retained within the groove of the housing by the retaining rod of the housing and the retaining plate, and wherein the retaining plate at least partially surrounds the first end of the structural member within the groove.

10. The propulsion system of claim 9, wherein the first end of the structural member is retained between the retaining rod and the retaining plate.

11. The propulsion system of claim 10, wherein the flameholder assembly further comprises a third coupling member attached to an inner casing, and wherein the flameholder assembly comprises a spacer disposed between the third coupling member and the retaining plate, wherein a mechanical fastener couples together the third coupling member, the spacer, and the retaining plate.

12. The propulsion system of claim 11, wherein the flameholder assembly defines a load path through the inner casing, the third coupling member, the spacer, and the retaining plate via the mechanical fastener.

13. The propulsion system of claim 11, wherein the propulsion system defines a load path through the flameholder assembly, and wherein the flameholder assembly defines a load path through the retaining rod of the housing, the structural member at the first end coupled to the retaining rod, and the structural member at the second end coupled to the outer casing of the propulsion system.

14. The propulsion system of claim 9, wherein the retaining rod defines an axis of rotation generally tangent to a circumferential direction around an axial centerline of the propulsion system, and wherein the structural member is restricted from displacement along the axis of rotation.

15. The propulsion system of claim 9, wherein the retaining rod restricts displacement of the flameholder assembly along the longitudinal direction of the propulsion system.

16. A gas turbine engine comprising a hot section defining a combustion section and a turbine section, the gas turbine engine comprising:
  inner casing extended generally along the longitudinal direction and radially within the outer casing;
  a coupling assembly comprising:
    a housing defining a groove, and a retaining rod within the groove;
    a structural member defining a first end coupled to the retaining rod;
    a retaining plate coupled to the housing, wherein the retaining plated defines an opening through which the structural member is extended;
    wherein the structural member is retained to the retaining rod within the groove of the housing by the retaining plate, the retaining plate at least partially surrounding the first end of the structural member within the groove;
    a coupling member attached to the inner casing; and
    a spacer disposed between the coupling member and the housing, wherein a mechanical fastener couples together the coupling member, the spacer, the housing, and the retaining plate.

17. The gas turbine engine of claim 16, wherein a load path is defined through the annular flameholder casing, the coupling member, the spacer, and the retaining plate via the mechanical fastener.

18. The gas turbine engine of claim 16, wherein the gas turbine engine defines a load path through the inner casing, the coupling member, the spacer, and the retaining plate.

19. The gas turbine engine of claim 16, wherein the the coupling assembly is disposed in the combustion section of the engine.

20. The gas turbine engine of claim 16, wherein the engine comprises an afterburning exhaust section, and wherein the inner casing and the outer casing each surround the afterburning exhaust section of the engine.

* * * * *